Sept. 15, 1936.   F. B. McQUISTON ET AL   2,054,435
STENCILING APPARATUS
Filed Sept. 24, 1935   3 Sheets-Sheet 1
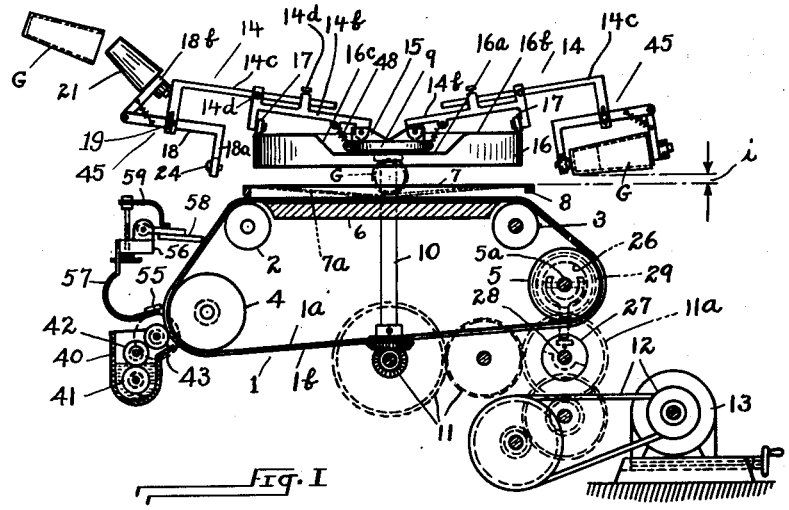
Fig. I
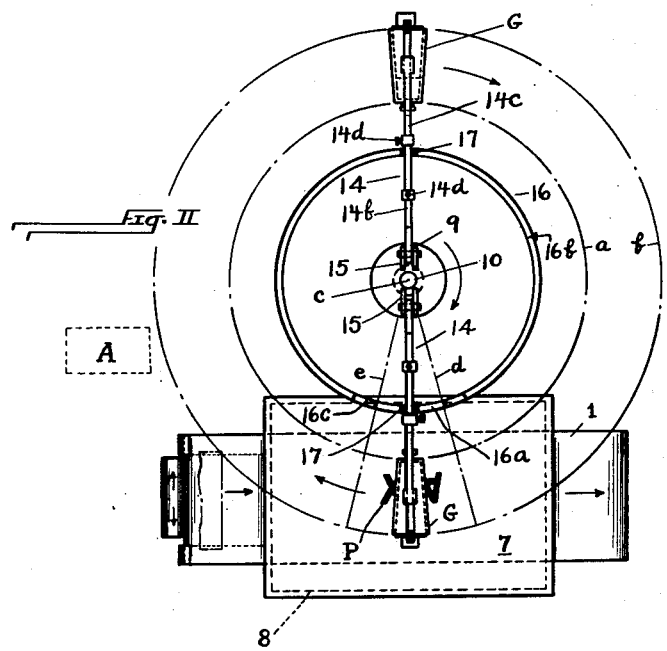
Fig. II
INVENTORS
Frederick B. McQuiston
BY Ernest M. Hommel
Christy and Wharton
ATTORNEYS Sept. 15, 1936. F. B. McQUISTON ET AL 2,054,435
STENCILING APPARATUS
Filed Sept. 24, 1935 3 Sheets-Sheet 2
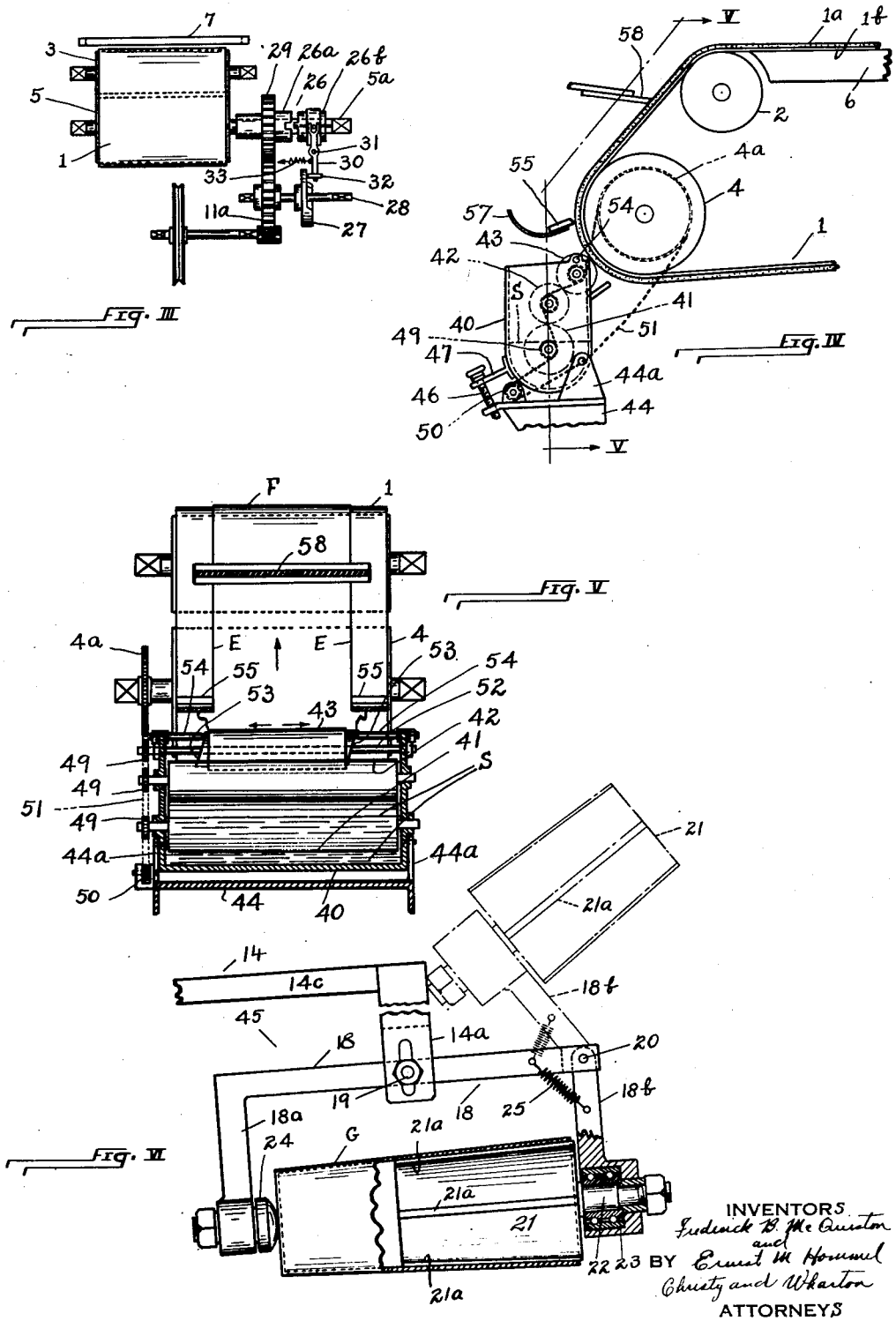
INVENTORS
Frederick B. McQuiston
and
Ernest M. Hommel
BY Christy and Wharton
ATTORNEYS Sept. 15, 1936.  F. B. McQUISTON ET AL  2,054,435
STENCILING APPARATUS
Filed Sept. 24, 1935  3 Sheets-Sheet 3
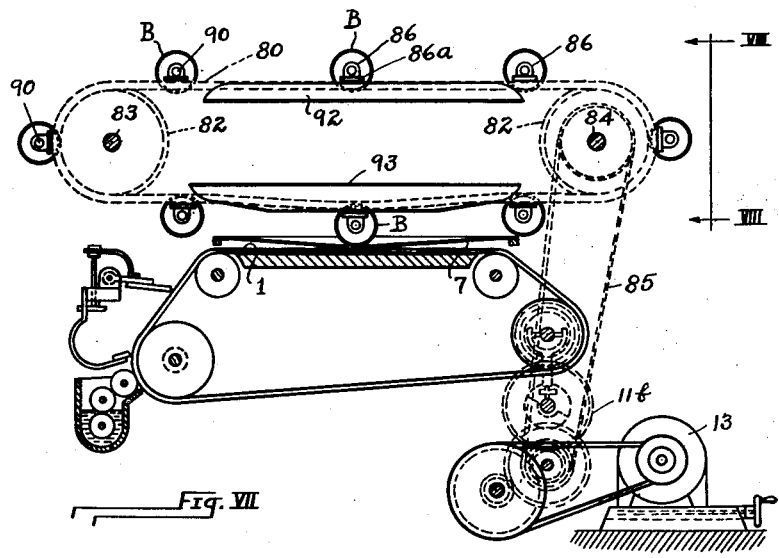
Fig. VII
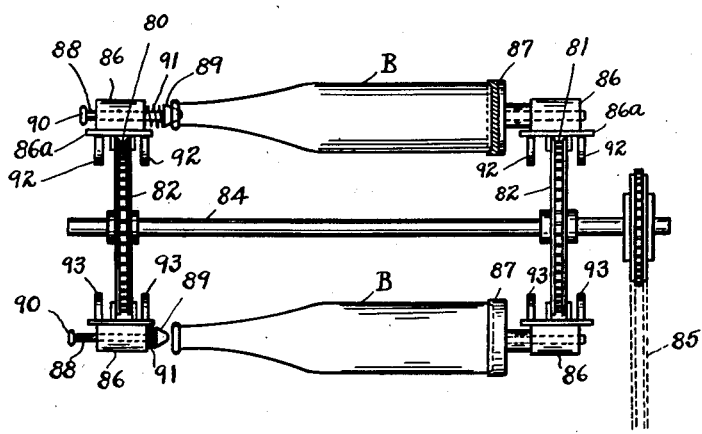
Fig. VIII
INVENTORS
Frederick B. McQuiston
BY Ernest M. Hommel
Christy and Wharton
ATTORNEYS Patented Sept. 15, 1936

2,054,435

UNITED STATES PATENT OFFICE 2,054,435

STENCILING APPARATUS

Frederick B. McQuiston, Crafton, and Ernest M. Hommel, Pittsburgh, Pa., assignors to The O. Hommel Company, a corporation of Pennsylvania Application September 24, 1935, Serial No. 41,904

18 Claims. (Cl. 101—124)

Our invention relates to stenciling machines, and consists in refinements and elaborations of the apparatus disclosed in Letters Patent No. 2,011,363, granted to Ernest M. Hommel on August 13, 1935.

We are concerned with the surface ornamentation of tumblers, bottles, jars and other objects of circular cross section, and the invention is particularly, although not exclusively, directed to apparatus for applying characters or designed decorations of vitreous color material to such objects of glass, to the end that the objects may be fired and in known manner the color material vitrified and fused in the surface of the glass.

The vitreous color material is essentially a tacky, oleaginous liquid or paste, and difficulty has been experienced in making an uniformly distributed application of such material in well defined pattern upon the smooth surface of a glass object. The patentee in the above-noted patent describes apparatus in which a flexible stencil sheet, impervious in main and pervious in pattern, is drawn taut and supported an interval above and in parallelism with a plane surface that bears a coating or film of such decorating material. The object to be decorated is rolled by hand across the upper face of the stencil, and, under the pressure of the object, the flexible stencil is caused to yield from the plane of its expanse downward, and into contact with the film-bearing surface beneath. The decorating material is exuded through so much of the stencil as is pervious and upon the surface of the rolling object. We have found that good results are obtained in the operation of such apparatus.

More particularly our invention consists in a machine embodying the apparatus of said patent in organization with means for automatically rolling the objects to be decorated across the face of the flexible stencil sheet, together with means for automatically applying the decorating material upon the film-bearing surface beneath. We have developed a machine for decorating drinking glasses or tumblers whose circular side walls taper from top to bottom, and the invention (by way of illustration and not limitation) will be described in such embodiment. And we shall describe certain modifications in the machine, showing in exemplary way how the invention may be practiced in decorating objects of other circular shapes.

In the accompanying drawings Fig. I is a diagrammatic view of the machine, partly in front elevation and partly in vertical section; Fig. II is a diagrammatic view of the machine in plan from above; Fig. III is a fragmentary view of the machine in end elevation; Fig. IV is a fragmentary view, showing in side elevation and to larger scale the instrumentalities for applying the decorating material upon the film-bearing surface; Fig. V is a sectional view of such instrumentalities, taken on the broken plane V—V of Fig. IV; Fig. VI is a fragmentary view on still larger scale, showing one of the tumbler-supporting devices of the machine, partly in side elevation and partly in vertical section; Fig. VII is a view comparable with Fig. I, illustrating a modified work-carrier in organization with the stenciling instrumentalities of the machine; and Fig. VIII is a view in elevation, on the plane VIII—VIII of Fig. VII, of the modified work-carrier.

Referring to Fig. I of the drawings, the machine includes an endless band 1, trained over four supporting rollers 2, 3, 4, 5. Between the rollers 2 and 3 the band extends horizontally and is supported from beneath by a rigidly mounted platen 6; the band 1 consists of a flexible belt 1a of thin sheet metal, or of sturdy fabric, carrying a smooth facing 1b of sponge rubber, or other suitable yielding material, and upon the facing 1b a film of the decorating material is applied. Above the upper, horizontal reach of the film-bearing band, a flexible stencil sheet 7 is supported; the structure of the flexible stencil sheet is fully described in the above-noted patent, and suffice it herein to say: first, the sheet is impervious in main and pervious in the pattern of the characters or decoration to be applied to the drinking glasses (Fig. II shows the stencil provided with an open-work pattern P); second, the flexible stencil is drawn taut and secured to a frame 8; and third, the frame 8 supports the stencil in parallelism with and an interval above the area of the film-bearing band lying upon the rigid platen 6.

In accordance with the teaching of the aforesaid patent, the glass object G to be decorated is brought to bear upon the upper face of the stencil, and is rolled across the open-work pattern P provided therein. Under the pressure of the rolling object, the stencil sheet is caused to yield downward from the normal plane of its expanse, as indicated by the dotted lines 7a in Fig. I, and into contact with the film-carrying surface of the band 1. The line of contact of the stencil with the band advances with the rolling object, and the decorating material is squeezed through the open-work pattern P, and is progressively applied to the surface of the object. There is no slipping between the surface of the object and the stencil, nor smearing of the decorating material over the upper face of the stencil; and the rolling object G, upon traversing the patterned area of the stencil, is provided with a decoration in the clean outline of the pattern P.

As has been already mentioned, the objects to be decorated in this case are tumblers or drinking glasses G. The side wall of each tumbler tapers from top to bottom, whereby the body of the tumbler comprises the frustum of a cone.

In accordance with our invention we provide a rotary work-carrier for rolling the tumblers in circular path across the pervious area of the stencil sheet. The circular path through which each tumbler G is rolled lies between the circles $a$ and $b$, indicated in Fig. II, and the common center $c$ of these circles lies at the apex of the cone of which the tumbler comprises a frustum. Each tumbler G advancing through the circular path $a$—$b$ rolls on its side over the face of the stencil sheet 7, and the line of contact between the tumbler and the stencil extends radially of the point $c$. As the tumbler so rolls, the line of contact between tumbler and stencil moves angularly about the point $c$ as a center. Thus, the engagement between the stencil sheet and the rolling tumbler is a perfect rolling engagement at all points longitudinally of such line of contact.

In structure the work-carrier includes a head 9, mounted upon the upper end of shaft 10; the shaft 10 extends vertically, and is positioned to one side of the horizontal stencil sheet, as shown in Fig. II. The shaft is rotatably mounted in the frame of the machine, and it may be noted that such frame has been omitted from the drawings for the sake of clarity. In the normal operation of the machine, the shaft 10 is rotated continuously and at relatively slow speed, and to this end a motor 13 is connected to the shaft, by means of a variable speed driving device 12 of well-known type and a gear-train 11.

The work-carrier includes a plurality of arms—in this case two arms 14—extending radially with respect to shaft 10; the inner ends of the arms 14 are pivotally secured in brackets 15 to the head 9, and the outer ends of the arms severally carry devices 45 for rotatably supporting the tumblers to be decorated, with the axes of the tumblers extending radially of the center of carrier rotation. A circular cam-ring 16, concentric with shaft 10, is rigidly supported beneath the arms 14, and each arm 14 carries intermediate its opposite ends a wheel 17 which is held in rolling engagement with the upper edge of the cam-ring, by means of a tension spring 48 arranged between the arm and the head 9 (Fig. I). As the shaft 10 rotates, the radially extending arms 14 turn about the axis of the shaft as center, and the wheels 17 ride the upper edge of the cam-ring.

Referring to Fig. VI, it will be perceived that the tumbler-supporting device 45 carried by each arm 14 consists of a frame 18 of inverted U-shape, secured (by means of a screw 19) to a rigid finger 14a extending downwardly from the end of the arm. The leg 18a of the U-frame is rigid, while the opposite leg 18b is adapted to swing, on a pivot 20, about the base of the U. A conical block 21 is mounted on a spindle 22; the spindle 22 is rotatably secured in the foot of leg 18b, and a double race of antifriction bearings 23 insures that the block shall be delicately sensitive to rotative stress. And in like manner a rubber-faced knob 24 is rotatably secured in the foot of leg 18a. The tumbler to be decorated is seated upon the conical block 21, as shown in Fig. VI, and a spring 25, effective between the base of the U-frame and the leg 18b, tends to swing such leg clockwise, with the consequence and effect that the bottom of the mounted tumbler G is held against the rotary knob 24. The axes of knob 24 and block 21 extend in alignment and parallel to the arm 14, and, manifestly, when the arm in the course of its rotation crosses the stencil sheet 7, the rotatably supported tumbler rolls freely over the face of the stencil in the manner already described. In introducing a tumbler to the apparatus, the attendant swings the leg 18b upward into work-receiving position, as shown in broken lines in Fig. VI and in full lines in the left-hand portion of Fig. I, and it will be observed that the leg 18b is swung upward (the spring 25 at first resisting and ultimately aiding rotation) and about an axis (20) extending transversely of and above the axis of tumbler rotation. In the elevated, work-receiving position of the leg 18b, the attendant readily slips the tumbler to be decorated into position upon the conical block 21. The leg 18b is then swung back into its normal position, and the tumbler is by spring 25 held in the position shown in Fig. VI, ready to be carried across the face of the stencil. It may be remarked that a plurality of rubber strips 21a are embodied in the conical block 21, with the presented edges of the strips lying an interval outward from the face of the block. These strips, rather than the side face of the block, engage the inner surface of the installed tumbler, and, accordingly, the wall of the tumbler is engaged on lines, rather than on an extended area, of contact. In this way, the objectionable tendency for the tumbler to become too tightly wedged upon the conical block is eliminated.

Advantageously, each arm 14 is constructed of two telescopic sections 14b and 14c; the two sections extend in parallelism, and normally are rigidly integrated by means of set-screws 14d (Fig. I). By loosening the set-screws, the section 14c may be adjusted longitudinally of the section 14b, and, accordingly, the radial extent or length of the arm may be regulated. Additionally, it will be perceived that, by loosening the screw 19, the normally fixed angular position of the U-frame 18 at the end of each arm may be varied, and the inclination of the axis of tumbler rotation adjusted with respect to the horizontal. By virtue of such structure, the apparatus may be adjusted for variation in size and conical contour of the tumblers to be decorated.

The attendant stands in the station A, indicated in Fig. II, and, as each of the continuously rotating arms 14 swings from a position above the stencil sheet towards him, he removes the decorated tumbler and introduces in its place a tumbler to be decorated. The rotating arms 14 carry the installed tumblers clockwise in circular path $a$—$b$ from station A to a position above the stencil 7, and the upper edge 16b of the cam-ring 16 is so designed that the arms 14, cooperating with the edge 16b of the cam, support the tumblers moving through such circular path an interval $i$ (Fig. I) above the face of the stencil. Adjacent the stencil, an interruption 16a is provided in the continuity of edge 16b of the cam, and, as the distal end of each tumbler-bearing arm 14 reaches a predetermined position above the stencil (such position being indicated by broken line $d$ in Fig. II), the cam-riding wheel 17 of the arm enters the interruption 16a in the edge of the cam-ring. Thereupon, under the influence of gravity and aided by the spring 48, the arm 14 swings downward about its pivotal support 15, and the tumbler borne by the arm engages and depresses the stencil sheet 7 and carries it to contact with the band 1 that is faced with decorating material. Thus, while rotation of the arm 14 continues unabated, the tumbler is rolled across the pervious area P of the stencil, and receives a decoration of color material.

When the rolling tumbler has traversed the pervious area of the stencil, and the rotating arm 14 has reached the position e (Fig. II), the cam-riding wheel 17 of the arm rolls up an inclined portion 16c (Fig. I) in the peripheral edge of the cam. The arm by such means is swung upward and the decorated tumbler is raised from contact with the stencil. As the decorated tumbler moves on to station A, the attendant removes it, as mentioned above, and installs an undecorated one in its place. Thus, the machine is adapted to roll tumblers in succession upon band 1 (with stencil sheet 7 between) and severally to provide them with decorations of vitreous color material.

In each interval between the successive engagements of the tumblers with the stencil, the endless band 1 is caused automatically to advance through such interval that a fresh or new expanse of the applied film of color material is carried into position beneath the stencil.

The means for effecting the successive advances of the band 1 consist of a motor and transmission means that include a normally disengaged clutch 26 which is intermittently shifted into engaged position in response to the rotation of a cam 27 (cf. Figs. I and III). More specifically, the clutch 26 includes two clutch elements 26a and 26b mounted in known way upon the shaft 5a of band-supporting roller 5; the clutch element 26b is axially reciprocable upon the shaft 5a, and is splined for common rotation with the shaft; and the element 26a is freely rotatable upon the shaft but is secured against axial movement. The clutch element 26a carries a gear 29 that meshes with a gear 11a included in the gear-train 11 through which motor 13 drives the work-rotating shaft 10, and, so long as the motor 13 is energized, the gear 29 rotates, but, save as hereinafter described, the roller 5 and band 1 normally remain at rest.

The clutch element 26b is embraced by and pivotally secured to a yoke at the upper end of a yoke-lever 30; the lever 30 is mounted upon a pivotal support 31, and carries at its lower end a wheel 32 that is held, by means of a tension spring 33, in rolling engagement with the face of cam 27. The cam 27 is mounted upon shaft 28 of gear 11a, and rotates continuously during the operation of the machine, and the rotating cam, in conjunction with lever 30 and spring 33, effects the periodic shifting of the clutch element 26b into and out of engagement with the clutch element 26a. In consequence, the gear 29 is intermittently united with the shaft 5a; the roller 5 is intermittently rotated in unison with the positively driven gear 11a, and the band 1 is intermittently caused to travel. The design of the cam 27 is such that the clutch is held in engagement during a sufficient interval of time for the band to travel a linear distance, longitudinally of the stencil sheet 7, equal to or in excess of the extent of the pervious area P. Thereupon, the cam 27 (in conjunction with the spring 33) swings the lever 30 and disengages the clutch.

The roller 5 and band 1 immediately come to rest. In this manner the band 1 is caused to advance in such coordination with the rotating work-carrier (9, 14) that a new film of color material is carried into position beneath the stencil sheet after the passage of each tumbler.

Means are provided for applying the film of decorating material upon the band 1, and, advantageously, such means are positively driven simultaneously with the advance of the band. Referring particularly to Figs. IV and V, we provide a supply hopper 40, including a mixing roll 41, a transfer roll 42, and an applicator roll 43. The hopper 40 is pivotally mounted on brackets 44a of a stationary frame element 44 of the machine, and an adjusting screw 46 (Fig. IV) is organized between the frame element and a rigid arm 47 on the hopper. For reasons presently to appear, the angular position of the hopper may be varied by adjustment of this screw. The band-supporting roller 4 carries on its shaft a sprocket-wheel 4a; the shafts of the rolls 41, 42, and 43 are severally equipped with sprocket-wheels 49; and an idler sprocket-wheel 50 is rotatably mounted on the frame element 44. The several sprocket-wheels lie in common vertical plane, as shown in Fig. V, and a sprocket-chain 51 is trained over them in the manner indicated in Fig. IV. When the band 1 travels in response to the positive rotation of roller 5, the roller 4 is rotated, and in unison therewith the three rolls 41, 42, 43 within the hopper rotate.

As shown in Fig. V, the roll 41 is partially immersed in the supply S of decorating material maintained in hopper 40, and this roll serves to agitate the body of decorating material and maintain it in homogeneous condition. The surface of the rotating roll 41 carries decorating material from the supply pool S to the surface of transfer roll 42, and the roll 42 transfers the decorating material from its surface to the surface of applicator roll 43. And roll 43 in turn applies the material to the face of band 1, during its intermittent advances. The applied film of decorating material desirably should be fluid and of uniform consistency, smooth, and of precisely regulated and uniform depth, and we have found that improved results are gained by axially reciprocating the applicator roll 43, while it is rotating and applying the tacky color material to the face of band 1; that is, by axially reciprocating the rotating applicator roll 43, the applied coating or film is much smoother and more consistent than a film applied by a roll that is merely rotated. In this case, the applicator roll 43 is keyed to its supporting shaft 52 (Fig. V), and is free to slide axially of such shaft; the opposite ends of the applicator roll are equipped with complementary cams 53, 53; and fingers 54, rigidly mounted in the wall of hopper 40, severally bear at their tips against said cams. The structure is such, manifestly, that as the roll 43 is positively rotated in response to the rotation of shaft 52, the engagement of the fingers 54 with the cams 53 effects the desired axial reciprocation of the roll. And in this manner the applicator roll is caused both to rotate and to reciprocate while the band 1 is travelling and color material is being applied.

We have found advantage in keeping the opposite edges of the applied film of color material within the opposite edges of the band 1. As shown in Fig. V, the opposite edges E of the applied film F are dressed and aligned by means of scrapers 55. The scrapers in this case consist of rubber blocks which are supported upon a frame element 56 (Fig. I) by means of resilient metal straps 57. In width the film F substantially equals the pervious area P of the stencil sheet, and, as just mentioned, the opposite edges of the film are dressed and lie a substantial interval within the opposite edges of the band 1.

As the band 1 travels upward from the supporting roller 4 (Fig. IV), the applied film of color material passes beneath the edge of a rubber spreader 58; the spreader is pivotally mounted upon the frame element 56, as shown in Fig. I, and is pressed downward into engagement with the film of color material, by means of a resilient finger 59. The spreader 58 smooths the surface of the applied color material, and produces uniformity in the depth of the film.

The pressure of the roll 43 against the band 1 may be regulated, and such regulation is obtained by turning the screw 46 (Fig. IV) and adjusting the hopper 40 angularly about its pivotal mounting in brackets 44a. Additionally, and in well-known manner, the spreader 58 may be adjusted in position relatively to the adjacent reach of band 1. And by virtue of this double regulation of roll and spreader, we establish and maintain in the applied film the desired depth of color material.

It is contemplated that cylindrical objects, and round objects of other contours, may be decorated in our machine, and in exemplary way we show in Figs. VII and VIII a modified work-carrier adapted to roll bottles across the face of the stencil screen 7. The modified work-carrier includes two endless conveyor chains 80 and 81 extending in parallel reaches between sprocket-wheels 82 mounted on spaced-apart, rotatably supported shafts 83 and 84. A chain-drive 85 connects the shaft 84 with the gear-train 11b which is driven by the motor 13, and, when the motor is energized, the shaft 84 is rotated and the two conveyor chains travel in unison, rounding the sprocket-wheels 82 in a clockwise direction, as viewed in Fig. VII. Secured in known manner to each conveyor chain is a plurality of bearing blocks 86; the bearing blocks on each chain are eight in number in this case, and are equispaced in the extent of the chain; and the blocks on chain 80 are severally aligned transversely of the path of chain advance with the blocks on chain 81. As shown in Fig. VIII, a socket member 87 is rotatably mounted in each block 86 on the chain 81, and in each block on the chain 80 a spindle 88 is rotatably secured. The spindles severally carry conical elements 89, say of rubber, at their inner ends, and knobs 90 at their outer ends, and a compressed helical spring 91 is arranged on each spindle between the element 89 and the adjacent face of the supporting block 86. The spindles 88, thus rotatably borne by the conveyor chain 80, are severally aligned with the socket members 87 borne in such manner by the chain 81, and each of the paired spindle and socket members comprises a rotary supporting device for a bottle B to be decorated.

In the operation of the machine, the attendant installs a bottle B in each supporting device 87, 89, and, conveniently, installation is made while the travelling supporting devices are rounding the sprocket-wheels on shaft 83. In making each installation, the attendant pulls the spindle 88 of the particular bottle-supporting device outward, against the resistance of spring 91, and, as shown in the lower portion of Fig. VIII, a bottle is positioned with its bottom in socket member 87; then the spindle 88 is released, and under the urging of spring 91 it moves inward, carrying the conical element 89 into the mouth of the bottle. In this manner the bottles to be decorated are successively installed in the rotary supports of the conveyor. As the conveyor travels, the rotatably supported bottles are automatically carried through the upper reach of the conveyor, then downward around shaft 84, whence they are moved across the face of stencil screen 7.

Rails 92 and 93 are rigidly secured between the shafts 83 and 84, and the bearing blocks 86 severally include flanges 86a that ride these rails, and vertically guide the bottle supports as they are advanced through the upper and lower reaches of the conveyor. As shown in Fig. VII, the lower edges of the rails 93 are so particularly formed that each bottle B, upon entering rolling engagement with the stencil sheet, is (by the cooperation of flanges 86a with the nether edges of the rails) shifted toward the film-bearing face of band 1. Thus, the rolling bottle is caused to press the stencil sheet or screen 7 into contact with the film-bearing surface of the band, and, in the manner already described, decoration is automatically applied.

It will be understood that various modifications may be made in the machine without departing from our invention: The work-carrier may be arranged horizontally beneath the film-bearing surface, with the stencil interposed between; alternately, the conveyor may be arranged to move the objects through a vertical course, and to cooperate with a vertically disposed surface carrying the decorating material. The movement of the work-carrier is described above as continuous, but it will be obvious to the engineer that means may readily be provided for causing the work-carrier to pause between each passage of an object over the stencil. And it will be understood, upon reference to application Serial No. 683,142, filed August 1, 1933, by Ernest M. Hommel and Elmer E. Hicks, now Patent No. 2,027,102, dated January 7, 1936, that means may be provided for positively rotating the objects in engagement with the stencil, and that automatic means may be provided for installing the objects in the rotary supports of the work-carrier.

Notice is hereby given of our co-pending application for patent for Stenciling apparatus, Serial No. 89,742, filed July 9, 1936.

We claim as our invention:
1. In stenciling apparatus including a body presenting decorating material over an extended surface, and a stencil sheet impervious in main and pervious in pattern supported at an interval from said surface; the combination of a rotary work-carrier, said carrier including means for rotatably supporting a conical object to be decorated, with the axis of the object extending radially of the axis of carrier rotation, and means for rotating said carrier and causing said object engaging the stencil sheet to roll across said surface with the stencil sheet interposed between.

2. In stenciling apparatus including a body presenting decorating material over an extended surface, and a stencil sheet impervious in main and pervious in pattern supported at an interval from said surface; the combination of a work-carrier, said carrier including means for rotatably supporting a round object to be decorated, means for driving said carrier and causing said object to advance in rolling engagement with said stencil sheet, and means for shifting said rotary, object-supporting means transversely of the path of object advance and forcing said stencil under the pressure of the rolling object into contact with said surface, whereby the object engaging the stencil sheet is rolled across said surface with the stencil sheet interposed between.

3. In stenciling apparatus including a body presenting decorating material over an extended surface, and a stencil sheet impervious in main and pervious in pattern supported at an interval from said surface; the combination of means for rotatably supporting a round object to be decorated in rolling engagement with said stencil sheet, means for advancing said object-supporting means relatively to said surface, and means for effecting relative movement between said object and stencil transversely of the path of said advance, whereby the object rolls upon said surface with the stencil sheet interposed between.

4. In stenciling apparatus including a member presenting on extended surface a film of decorating material, and a flexible stencil sheet impervious in main and pervious in pattern supported at an interval from said surface; the combination of a work-carrier, said carrier including means for rotatably supporting a round object to be decorated, means for driving said carrier and causing said object to roll across the face of said stencil sheet, and means for shifting the rolling object relatively to said film-bearing surface, and thereby causing said sheet to yield into contact with said surface, whereby the decorating material in desired pattern is applied through the pervious area of the stencil sheet upon the surface of the rolling object.

5. In stenciling apparatus including a movable member presenting on extended surface a film of decorating material, and a flexible stencil sheet impervious in main and pervious in pattern supported at an interval from said surface; the combination of a work-carrier, said carrier including means for rotatively supporting a round object to be decorated, means for driving said carrier and causing said object engaging the stencil sheet to roll across said surface with the stencil sheet interposed between, and means for shifting said film-bearing member when said object has passed from said engagement with said surface.

6. In stenciling apparatus including an endless band mounted for travel over a support and bearing a film of decorating material, and a flexible stencil sheet impervious in main and pervious in pattern supported at an interval from the supported area of said band; the combination of a work-carrier, said carrier including means for rotatably supporting a round object to be decorated, means for driving said carrier and causing said object engaging the stencil sheet to roll across said area of the band with the stencil sheet interposed between, and means operable in coordination with the advance of said carrier for effecting the travel of said film-bearing band when said object has passed from such engagement with the band.

7. In stenciling apparatus including an endless band mounted for travel over a support and bearing a film of decorating material, and a flexible stencil sheet impervious in main and pervious in pattern supported at an interval from the supported area of said band; the combination of a rotary work-carrier, said carrier including means for rotatably supporting a conical object to be decorated, with the axis of the object extending radially of the axis of carrier rotation, means for rotating said carrier and causing said object engaging the stencil to roll across said area of the band with the stencil sheet interposed between, and means operable in coordination with carrier rotation for effecting the travel of said band.

8. In stenciling apparatus including a flexible stencil sheet impervious in main and pervious in pattern supported by a frame, and means for supporting a film of decorating material adjacent one face of said stencil sheet; the combination of means for rolling an object to be decorated in an arcuate course across the opposite face of said stencil sheet.

9. In stenciling apparatus including a flexible stencil sheet impervious in main and pervious in pattern supported by a frame, and means for supporting a film of decorating material adjacent one face of said stencil sheet; the combination of means for rolling an object to be decorated in an arcuate course across the opposite face of said stencil sheet, and means for shifting the rolling object relatively to said film of decorating material, and thereby causing said sheet to yield into progressively advancing contact with said film.

10. In stenciling apparatus including an endless band mounted for travel over a support and adapted to carry a film of decorating material, and a flexible stencil sheet impervious in main and pervious in pattern supported at an interval from the film-bearing surface of said band; the combination of a rotary work-carrier, said carrier including means for rotatably supporting a round object to be decorated, with the axis of the object extending radially of the axis of carrier rotation, means for rotating said carrier and causing said object to roll across said film-bearing surface with the stencil sheet interposed between, means for shifting the rolling object relatively to the film-bearing surface of said band, and thereby causing said stencil sheet to yield into contact with the film of decorating material, means operable in coordination with carrier rotation for effecting the travel of said band, means for applying said film of decorating material to the face of said travelling band, and means for dressing the applied film.

11. In stenciling apparatus including an endless band mounted for travel over a support and adapted to carry a film of decorating material, and a flexible stencil sheet impervious in main and pervious in pattern supported at an interval from the film-bearing face of said band; the combination of means for effecting travel of said band, means including a store of decorating material, and means including a rotary and axially reciprocable applicator roll for transferring decorating material from said store to the face of said band.

12. In stenciling apparatus including an endless band mounted for travel over a support and adapted to carry a film of decorating material, and a flexible stencil sheet impervious in main and pervious in pattern supported at an interval from the film-bearing surface of said band; the combination of means for effecting travel of said band, means including a store of decorating material, and means including a rotary and axially reciprocable applicator roll for transferring decorating material from said store to the face of said band, together with means for dressing the edges of the applied film of decorating material within the opposite edges of said band.

13. In stenciling apparatus including a stencil sheet, the combination of a movable work-carrier for rolling a round object to be decorated across the face of said stencil, said work-carrier including means for rotatably supporting said object, and said means including two members for engaging said object at opposite ends, and one of said members being angularly movable, between work-engaging and work-releasing position, about an axis extending transversely of the axis of the supported object.

14. The structure of claim 13, in which said work-carrier is rotatably mounted, and includes a radially extending arm of adjustable length carrying said object-supporting means at its outer end.

15. Stenciling apparatus including a stencil sheet, a rotatable work-carrier for moving an object to be decorated across said stencil sheet, a radial arm pivotally secured to said carrier, means carried by the outer end of said arm for rotatably supporting said object, and means for swinging said arm on its pivotal support and moving the supported object transversely of its path of movement across the stencil sheet.

16. In apparatus for decorating the surfaces of round objects, the combination of a decorating device including an extended face upon which to roll said objects, and means for rotatably supporting said objects with their axes directed toward a center of revolution, said rotatably borne objects being movable relatively to the decorating device in a path of revolution about said center, whereby the rotatably borne objects are caused to roll over the extended face of said decorating device.

17. In apparatus for decorating the surfaces of round objects, the combination of a decorating device including an extended face upon which to roll said objects, and means for rotatably supporting said objects with their axes directed toward a center of revolution, said rotatably borne objects being movable relatively to the decorating device in a path of revolution about said center, whereby the rotatably borne objects are caused to roll over the extended face of said decorating device, and means for effecting movement of the objects relatively to the face of said decorating device in a direction transverse of said path.

18. In stenciling apparatus including a body presenting decorating material over an extended surface, and a stencil sheet impervious in main and pervious in pattern supported at an interval from said surface; the combination of means for rotatably supporting a round object to be decorated, said means being movable for advancing said object in rolling engagement with said stencil sheet, and the structure of said supporting means admitting of movement of the supported object transversely of the path of said advance, whereby the object rolls upon said surface with the stencil sheet interposed between.

FREDERICK B. McQUISTON.
ERNEST M. HOMMEL.